United States Patent
Rabret et al.

(10) Patent No.: US 9,793,771 B2
(45) Date of Patent: Oct. 17, 2017

(54) ROTOR OF AN ELECTRIC MOTOR, WITH AN OUTER SLEEVE FORMED BY WINDING, METHOD FOR PRODUCING SUCH A ROTOR, AND ELECTRIC MOTOR COMPRISING SUCH A ROTOR

(71) Applicant: SAFRAN ELECTRONICS & DEFENSE, Boulogne Billancourt (FR)

(72) Inventors: Bernard Rabret, Boulogne Billancourt (FR); Bruno Andre, Boulogne Billancourt (FR); Gaetan Princay, Boulogne Billancourt (FR); Jerome Piaton, Boulogne Billancourt (FR); Thierry Bessede, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 13 days.

(21) Appl. No.: 14/647,780

(22) PCT Filed: Nov. 28, 2013

(86) PCT No.: PCT/EP2013/074987
§ 371 (c)(1),
(2) Date: May 27, 2015

(87) PCT Pub. No.: WO2014/083114
PCT Pub. Date: Jun. 5, 2014

(65) Prior Publication Data
US 2015/0326081 A1    Nov. 12, 2015

(30) Foreign Application Priority Data
Nov. 28, 2012  (FR) ..................... 12 03214

(51) Int. Cl.
*H02K 1/28*   (2006.01)
*H02K 1/27*   (2006.01)
(Continued)

(52) U.S. Cl.
CPC ............... *H02K 1/28* (2013.01); *H02K 1/278* (2013.01); *H02K 15/03* (2013.01); *H02K 15/12* (2013.01); *Y10T 29/49014* (2015.01)

(58) Field of Classification Search
CPC .......... H02K 1/278; H02K 1/28; H02K 21/04; H02K 21/042
(Continued)

(56) References Cited

U.S. PATENT DOCUMENTS

| 4,638,200 A | 1/1987 | Le Corre et al. |
| 4,920,634 A * | 5/1990 | Cole ............... H02K 1/278 29/598 |

(Continued)

FOREIGN PATENT DOCUMENTS

| EP | 1 978 620 A2 | 10/2008 |
| JP | S57-177263 A | 10/1982 |

(Continued)

OTHER PUBLICATIONS

Machine Translation, Iizuka et al., JP 61073559 A, Apr. 15, 1986.*

*Primary Examiner* — Thomas Truong
(74) *Attorney, Agent, or Firm* — Muncy, Geissler, Olds & Lowe, P.C.

(57) ABSTRACT

An electric motor rotor including a magnetic core, magnets fastened to the periphery of the magnetic core, and a wire wound with touching turns around the magnetic core and the magnets. The wire includes a metal core surrounded by an electrically insulating layer, itself covered by an outer sheath of thermo-adhesive material, the turns being fastened to one another by adhesion between mutually contacting portions (Continued)

of the outer sheath. A method of fabricating such a rotor. An electric motor including such a rotor.

8 Claims, 2 Drawing Sheets

(51) Int. Cl.
*H02K 15/03* (2006.01)
*H02K 15/12* (2006.01)

(58) Field of Classification Search
USPC ............ 310/156.28, 156.29, 156.31, 261.1
See application file for complete search history.

(56) References Cited

U.S. PATENT DOCUMENTS

| | | | |
|---|---|---|---|
| 4,930,201 A | 6/1990 | Brown | |
| 6,920,682 B2* | 7/2005 | Ku | H02K 1/278 |
| | | | 29/596 |
| 2003/0193255 A1 | 10/2003 | Ludwig | |
| 2004/0227425 A1* | 11/2004 | Murray | H02K 1/148 |
| | | | 310/216.059 |
| 2008/0093945 A1 | 4/2008 | Gruenhagen | |

FOREIGN PATENT DOCUMENTS

| | | |
|---|---|---|
| JP | S59-148555 A | 8/1984 |
| JP | S61-73559 A | 4/1986 |

\* cited by examiner

ROTOR OF AN ELECTRIC MOTOR, WITH AN OUTER SLEEVE FORMED BY WINDING, METHOD FOR PRODUCING SUCH A ROTOR, AND ELECTRIC MOTOR COMPRISING SUCH A ROTOR

BACKGROUND OF THE INVENTION

Field of the Invention

The present invention relates to a rotor for a permanent magnet electric motor, to a method of fabricating such a rotor, and to an electric motor including such a rotor.

Electric motor rotors are known that comprise a metal magnetic core with permanent magnets fastened to its periphery. By way of example, the permanent magnets may be adhesively bonded to the magnetic core.

In order to prevent the forces to which the magnets are subjected, in particular as a result of centrifugal force, causing the magnets to be torn from the magnetic core, it is known to cover the magnets in a steel sleeve, also referred to as a band, pressed tightly against the magnetic core and the magnets. In order to guarantee that the sleeve is sufficiently tight, it is necessary to true the rotor and the magnets, and to machine the inside diameter of the sleeve accurately. In addition, since the thickness of the sleeve determines the size of the magnetic gap between the rotor and the stator, it is necessary to adjust the outside diameter of the sleeve by machining once the sleeve is in place on the magnetic core and the magnets.

Description of Related Art

U.S. Pat. No. 4,930,201 explains how such a sleeve presents the drawbacks of increasing the inertia of the rotor and of facilitating the flow of eddy currents in the motor. That document proposes replacing the steel sleeve with a sleeve made as a winding of a thread of glass, aramid, or epoxy fibers, which winding is embedded in a resin. According to that document, the sleeve as formed in that way presents several advantages:

it presents smaller inertia than the sleeve made of steel;
it does not conduct and therefore it does not allow eddy currents to flow; and
the sleeve has a coefficient of thermal expansion that is smaller than that of the magnetic core such that heating of the rotor increases the clamping force exerted by the sleeve on the magnetic core.

Nevertheless, it is found that that arrangement suffers from the drawback of being difficult to perform. The thread is pre-impregnated with resin in liquid or viscous form, thereby making the thread difficult to handle. It is also possible to put the resin into place after winding the thread, but that adds an additional step and makes it necessary to ensure that the resin is uniformly distributed over the entire surface area and thickness of the sleeve.

BRIEF SUMMARY OF THE INVENTION

An object of the invention is to propose a rotor that is easy to make.

The invention results from transposing a winding technique that is conventionally used for making induction or excitation coils to fabricating the sleeves of electric motor rotors.

Conventionally, in order to fabricate such coils, an electrically conductive metal wire is used that is covered in an electrically insulating layer that is itself covered in a sheath of thermo-adhesive material in solid form. The wire is wound around a body in order to form touching turns and it is then heated so that the thermo-adhesive material of the adjacent turns polymerizes and serves to fasten the turns to one another.

The invention provides an electric motor rotor comprising a magnetic core, magnets fastened to the periphery of the magnetic core, and a wire wound with touching turns around the magnetic core and the magnets, the rotor being characterized in that the wire comprises a metal core surrounded by an electrically insulating layer, itself covered by an outer sheath of thermo-adhesive material, the turns being fastened to one another by adhesion between mutually contacting portions of the outer sheath.

The invention also provides a method of fabricating an electric motor rotor, the method comprising the steps of:

fastening magnets to the periphery of a magnetic core of the rotor;

winding touching turns of a wire around the magnets and the magnetic core, the wire comprising a metal core surrounded by an electrically insulating layer, itself covered by an outer sheath of thermo-adhesive material in solid form; and heating the wire to fasten the turns to one another by adhesion between mutually contacting portions of outer sheath.

The invention also provides an electric motor comprising a stator defining a housing that rotatably receives such a rotor.

Other characteristics and advantages of the invention appear on reading the following description of particular, non-limiting embodiments of the invention.

BRIEF DESCRIPTION OF THE SEVERAL VIEW OF THE DRAWINGS

Reference is made to the accompanying drawings, in which.

DETAILED DESCRIPTION OF THE INVENTION

Figure 1:
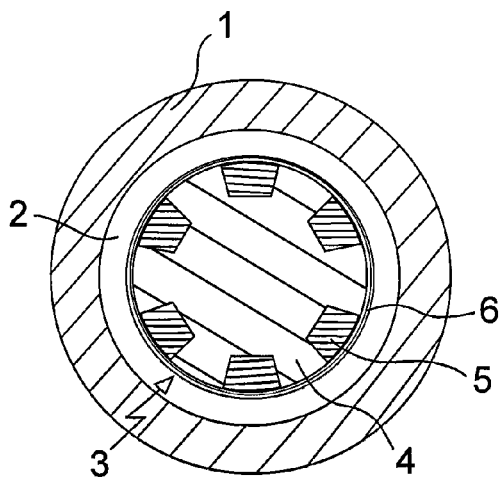
FIG. 1 is a diagrammatic cross-section view of an electric motor in accordance with the invention.
Figure 2:
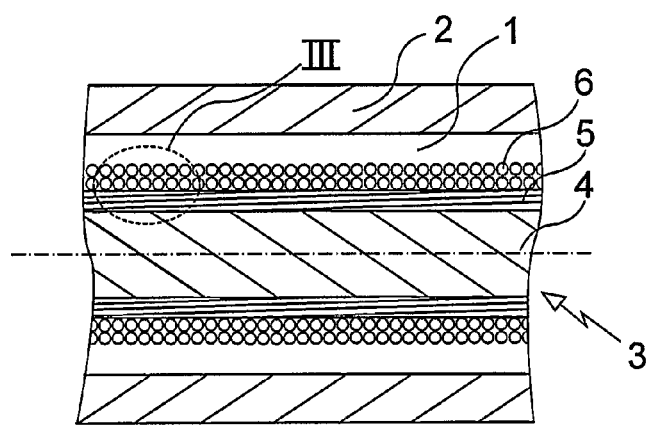
FIG. 2 is a fragmentary diagrammatic view in longitudinal section of the motor.
Figure 3:
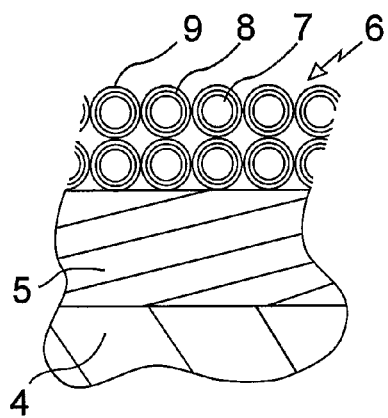
FIG. 3 is a detail view on a larger scale of a zone III in FIG. 2.

With reference to FIGS. 1 to 3, the electric motor of the invention comprises a stator 1 of conventional type comprising a body for conducting magnetic flux. The body defines a housing 2 that rotatably receives a rotor given overall reference 3.

The rotor 3 has a substantially cylindrical magnetic core 4 and permanent magnets 5 that are fastened to the periphery of the magnetic core 4. The magnets 5 are adhesively bonded in peripheral notches of the magnetic core 4. This arrangement of the magnetic core 4 and of the magnets 5 is itself known.

The rotor 3 also has a wire 6 that is wound in touching turns around the magnetic core 4 and the magnets 5 in order to form a sleeve for holding the magnets 5 on the magnetic core 4. In this example the wire 6 is wound in two layers, the turns touching in pairs within each layer and also touching from one layer to the other. The winding pitch is thus equal to the outside diameter of the wire 6. The tension in the wire 6 is such that the wire 6 is tight against the magnetic core 4 and the magnets 5.

The wire 6 has a metal core 7 surrounded by an electrically insulating layer 8 that is itself covered in an outer sheath 9 of thermo-adhesive material in solid form. The turns formed by the wire 6 are fastened to one another by adhesion between the outer sheath portions that are in contact with one another. By way of example, the wire 6 has an outside diameter of 0.1 millimeters (mm) with an electrically insulating layer 8 and an outer sheath 9 each having a thickness of a few micrometers. In this example, the metal core 7 is made of non-magnetic steel. This material is advantageous since the magnetic core 4 is itself made of steel, so that the wire 6 and the magnetic core 4 have identical coefficients of expansion: there is no need to take account of potential differential expansion when determining the tension for the wire 6.

The wire 6 has ends that are merely placed against the magnetic core 4 and fastened by adhesion of the facing portions of outer sheath 9.

The sleeve formed in this way serves to hold the magnets 5 on the magnetic core 4. Although the metal core 7 of the wire 6 is electrically conductive, the wire 6 does not conduct eddy currents because of the electrically insulating sheath 8.

The rotor of the invention is fabricated by performing a fabrication method comprising the following steps:
  fastening the magnets 5 on the periphery of the magnetic core 4, by adhesion in this example;
  winding touching turns of the wire 6 around the magnets 5 and the magnetic core 4; and
  heating the wire 6 in order to polymerize the thermo-adhesive material of the outer sheath 9 and fasten the turns to one another by adhesion between the mutually contacting portions of outer sheath 9.

The wire 6 is wound using a winding machine. Since the thermo-adhesive material of the outer sheath 9 is in solid or dry form, the wire 6 is easy to handle, in particular within the winding machine.

Heating is performed by the Joule effect by causing an electric current of appropriate magnitude to flow in the metal core 7 of the wire 6. In this example, the heating is performed directly in the winding machine immediately after finishing the winding. The heating causes the thermo-adhesive material to polymerize, thereby bonding together portions of the outer sheath 9 that are in contact with one another. To a small extent, this also leads to the turns being adhesively bonded to the magnetic core 4.

Figure 4:
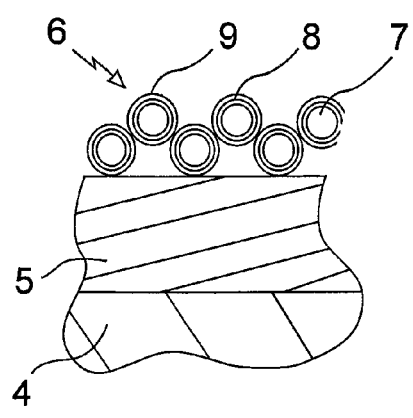
FIG. 4 is a view analogous to FIG. 3 in a variant embodiment.

In the variant of FIG. 4, the wire 6 is wound as two layers and the turns within each layer are not touching. Nevertheless, the turns touch one another from one layer to the other, each turn of the outer layer being supported by two adjacent turns of the inner layer. The winding pitch then needs to be greater than the outside diameter of the wire 6 and less than twice the diameter of the wire 6.

Figure 5:
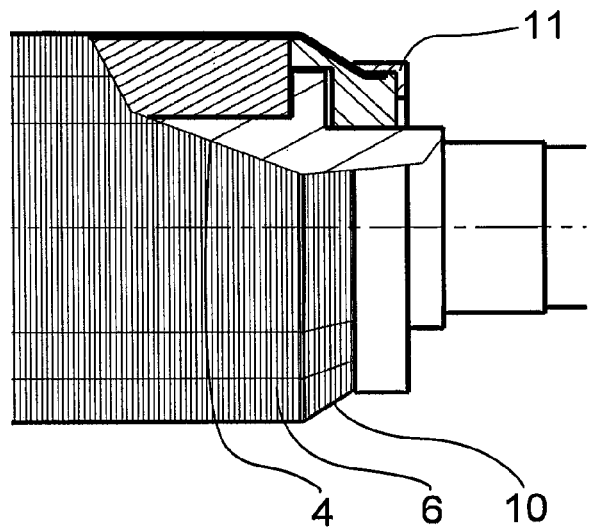
FIG. 5 is a fragmentary diagrammatic view in longitudinal section of a first alternative way of finishing the winding.
Figure 6:
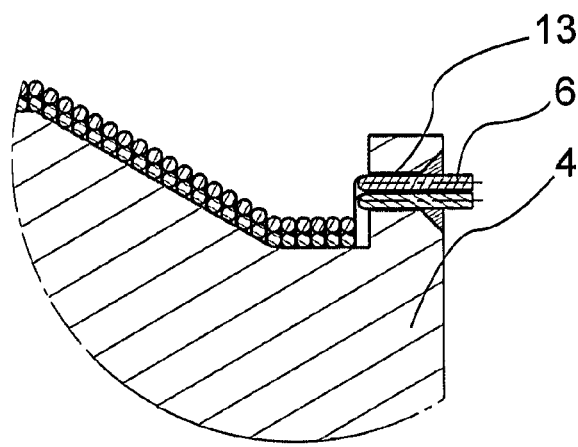
FIG. 6 is a fragmentary diagrammatic view in longitudinal section of a second alternative way of finishing the winding.
Figure 7:
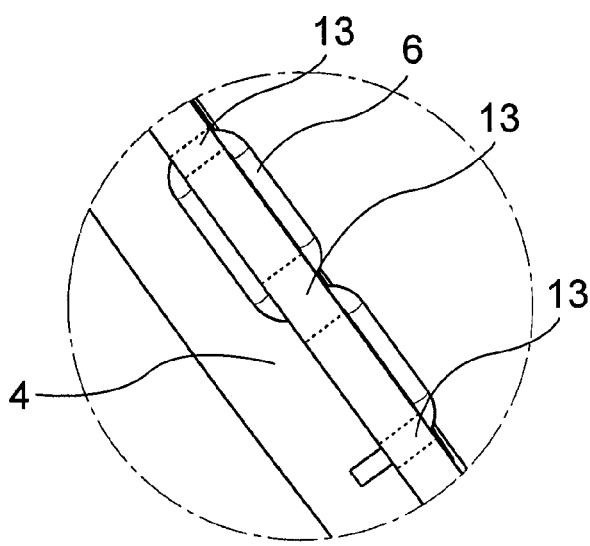
FIG. 7 is a fragmentary diagrammatic view in longitudinal section of a third alternative way of finishing the winding.

For the variant embodiments of FIGS. 5 to 7, the method includes an additional step of securing at least one end of the wire 6 to the magnetic core 4. Securing the ends of the wire 6 makes it possible to ensure that the ends of the wire 6 do not project from the rotor 3. This makes the rotor 3 easier to handle and guarantees good control over the maximum diameter of the rotor 3.

With reference to FIG. 5, the ends of the wire 6 are pressed against a frustoconical portion 10 of the magnetic core 4, and a cap 11 in the form of a ring having a frustoconical inside surface 12 is fastened on the frustoconical portion 10 in order to cover the ends of the wire 6. In a variant, there may be a respective cap 11 for each end of the wire 6, in particular when the number of layers is odd and the ends of the wire 6 are located at opposite ends of the winding.

With reference to FIG. 6, each of the ends of the wire 6 is engaged in an orifice 13 formed in the magnetic core 4. The orifice 13 may be a through hole or it may be blind.

With reference to FIG. 7, each of the ends of the wire 6 is engaged in three orifices 13 formed in the magnetic core 4 so as to be adjacent to one another. At least two of the orifices 13 are through holes and the end of the wire 6 passes through the orifices 13 and is interlaced between the orifices 13 so as to perform a kind of stitching that ensures that the end of the wire 6 is secured.

Naturally, the invention is not limited to the embodiments described, but covers any variant coming within the ambit of the invention as defined by the claims.

In particular the metal core 7 may be made of a metal other than steel, for example it may be made of aluminum or copper. The metal core 7 may also be made of magnetic steel, in particular when the magnets are of relatively large circumferential size, thereby limiting losses at the interfaces: it is possible to have a small airgap between the outermost magnetic portion of the rotor 3 (i.e. the wire 6) and the stator 1.

The wire 6 may be wound in one layer only, or in more than two layers.

The cap 11 may have a shape other than that described.

The wire 6 may also be heated by infrared radiation, by blowing hot air, or by other means.

The wire 6 may be heated on the winding machine or after the magnetic core 4 surrounded by the wire 6 has been extracted from the winding machine. Under such circumstances, it is necessary to make provision for holding the ends of the wire 6 in order to prevent the wire from unwinding before heating.

The invention claimed is:

1. An electric motor rotor comprising a magnetic core, magnets fastened to the periphery of the magnetic core, and a wire wound with touching turns around the magnetic core and the magnets, the rotor being characterized in that the wire comprises a metal core surrounded by an electrically insulating layer, itself covered by an outer sheath of thermo-adhesive material, the turns being fastened to one another by adhesion between mutually contacting portions of the outer sheath, and at least one end of the wire being engaged in at least one orifice formed in the magnetic core, wherein at least one cap is fastened on the magnetic core in order to cover at least one end of the wire and wherein the end of the wire is pressed against a frustoconical portion of the magnetic core and the cap is in the form of a ring having a frustoconical inside surface fastened to the frustoconical portion so as to cover the ends of the wire.

2. The rotor according to claim 1, wherein the metal core is made of steel.

3. The rotor according to claim 2, wherein the steel is non-magnetic.

4. An electric motor comprising a stator defining a housing that rotatably receives a rotor in accordance with claim 1.

5. An electric motor rotor comprising a magnetic core, magnets fastened to the periphery of the magnetic core, and a wire wound with touching turns around the magnetic core and the magnets, the rotor being characterized in that the wire comprises a metal core surrounded by an electrically insulating layer, itself covered by an outer sheath of thermo-adhesive material, the turns being fastened to one another by adhesion between mutually contacting portions of the outer sheath, and at least one end of the wire being engaged in at least one orifice formed in the magnetic core, wherein at least one end of the wire is engaged in a plurality of orifices arranged in the magnetic core.

6. An electric motor comprising a stator defining a housing that rotatably receives a rotor in accordance with claim 5.

7. The rotor according to claim 5, wherein the metal core is made of steel.

8. The rotor according to claim 7, wherein the steel is non-magnetic.

\* \* \* \* \*